US 8,345,587 B2

United States Patent
Shen et al.

(12) United States Patent
Shen et al.

(10) Patent No.: US 8,345,587 B2
(45) Date of Patent: Jan. 1, 2013

(54) RELAY STATION, BASE STATION AND METHOD FOR EXTENDING A COVERAGE AREA OF A BASE STATION IN A RADIO NETWORK

(75) Inventors: Gang Shen, Shanghai (CN); Wei Ni, Shanghai (CN); Wei Zou, Shanghai (CN); Jimin Liu, Shanghai (CN); Shan Jin, Shanghai (CN)

(73) Assignee: Alcatel Lucent, Paris (FR)

( * ) Notice: Subject to any disclaimer, the term of this patent is extended or adjusted under 35 U.S.C. 154(b) by 929 days.

(21) Appl. No.: 12/298,975

(22) PCT Filed: Apr. 17, 2007

(86) PCT No.: PCT/CN2007/001252
§ 371 (c)(1),
(2), (4) Date: Oct. 29, 2008

(87) PCT Pub. No.: WO2007/128206
PCT Pub. Date: Nov. 15, 2007

(65) Prior Publication Data
US 2009/0088165 A1 Apr. 2, 2009

(30) Foreign Application Priority Data
Apr. 29, 2006 (CN) .......................... 2006 1 0026259

(51) Int. Cl.
*H04B 7/14* (2006.01)
*H04B 7/15* (2006.01)
*H04W 4/00* (2009.01)

(52) U.S. Cl. .......................... 370/315; 370/328; 455/11.1
(58) Field of Classification Search .................. None
See application file for complete search history.

(56) References Cited

U.S. PATENT DOCUMENTS

| 5,898,679 | A  | * | 4/1999 | Brederveld et al. .......... 370/315 |
| 6,768,897 | B1 |   | 7/2004 | Suonvieri |
| 7,412,207 | B2 | * | 8/2008 | Poykko ........................ 455/11.1 |
| 7,590,383 | B2 | * | 9/2009 | Dean et al. ........................ 455/9 |
| 7,684,813 | B2 | * | 3/2010 | Benson et al. ................ 455/517 |
| 7,751,778 | B1 | * | 7/2010 | Ngan ........................... 455/11.1 |
| 2003/0013410 | A1 |   | 1/2003 | Park |
| 2004/0242154 | A1 |   | 12/2004 | Takeda et al. |

FOREIGN PATENT DOCUMENTS

| CN | 1272265 A | 11/2000 |
| CN | 1547862 A | 11/2004 |
| CN | 1211960 C | 7/2005 |
| CN | 1219410 C | 9/2005 |
| WO | WO2005/064872 | * 7/2005 |

OTHER PUBLICATIONS

International Search Report for Application No. PCT/CN2007/001252.

* cited by examiner

*Primary Examiner* — Nittaya Juntima
(74) *Attorney, Agent, or Firm* — Fay Sharpe LLP (57) ABSTRACT

A method for extending a coverage of a base station in a wireless communication network is disclosed, characterized in that a relay station transfers control information and communication related information between the base station and the mobile station according to an indication of the base station.

24 Claims, 10 Drawing Sheets

RELAY STATION, BASE STATION AND METHOD FOR EXTENDING A COVERAGE AREA OF A BASE STATION IN A RADIO NETWORK

FIELD OF THE INVENTION

The present invention relates to the field of wireless communication system, and particularly to the relay technology of wireless communication networks.

BACKGROUND OF THE INVENTION

IEEE 802.16 is newly developed techniques and protocols as a wireless alternative for cable, DSL services for last mile broadband access. It supports low latency applications such as voice and video, provides broadband connections of both Line-Of-Sight (LOS) and None-LOS (NLOS) between a mobile station (MS) and a base station (BS), and will support hundreds if not thousands of mobile stations from a single BS. With the new features and advantages, it is taken as one of the most promising candidates for future wireless access communication (4G). However, for more widely acceptance by the users, some bottleneck problems have to be solved. One of the key issues is coverage capability. IEEE802.16 works at the spectrum ranging above 2 GHz that is much higher than that of current systems and LOS propagation is preferred. As a result, the coverage is limited, especially in urban areas. At the edge of cells or in shadowed areas, some blind areas can be found due to complex radio environments. In addition, due to the high spectrum, indoor coverage turns to be a key issue and currently there has been no effective solution.

IEEE 802.16 mobile multi-hop relay (MMR) study group was newly founded in July 2005, focusing on extension of IEEE 802.16 for multi-hop and relay. It employs mobile multi-hop relay techniques between base station and mobile station, and thereby specifies a system and function on PHY and MAC layers to support the multi-hop relay. This amendment provides specifications for coverage extension and throughput extension, while being compatible with IEEE Std. 802.16e. The objectives of the relay introduction are throughput enhancement and coverage extension. But currently only throughput enhancement is achieved through simple relaying from contributions. No mature and efficient scheme is available for coverage extension since control signal cannot directly reach the MS when MS is out of the coverage of BS. Technical solution for coverage extension is urgently required in the standardization.

In the IEEE802.16 session #41 (January 2006), the study group has succeeded in defining the PAR (project authorization requirement) for the mobile multi-hop relay. The PAR clearly requires that the introduced relay station (RS) should be completely transparent to the legacy IEEE 802.16e mobile stations, which means that no change is permitted on the current specifications and protocols of IEEE 802.16e mobile station. And the PAR also requires that the complexity of the RS should be significantly less than the complexity of the BS, and the frame definition is OFDMA based. All these description and limitation give a definite description of the IEEE 802.16 RS and show a guideline for the technical solution for coverage extension in the relaying network.

SUMMARY OF THE INVENTION

An aim of the present invention is to provide a relaying method for extending the coverage of the base station in the wireless communication networks. Since the inventors of the present invention recognized that a mobile station could not receive the control information from a base station when locating out of the coverage of the base station, the present invention discloses a technical solution for using a relay station for relaying the control information between a base station and a mobile station which is located out of the coverage of the base station, in order to realize the relaying transmission between the base station and mobile station.

According to the first aspect of the present invention, a method is provided for implementing relay in a relay station in a wireless communication network, characterized in that: forwarding control information from a base station to a mobile station or forwarding control information from the mobile station to the base station according to the instruction from the base station.

Preferably, the method comprises the steps of:
receiving a communication control message from said base station;
regenerating a communication control message for the mobile station based on said communication control message from said base station;
sending the regenerated communication control message to said mobile station on a first subchannel according to said communication control message from said base station.

According to the second aspect of the present invention, a relay station is provided for implementing relay in a wireless communication network, characterized in that: forwarding control information from a base station to a mobile station or forwarding control information from the mobile station to the base station according to the instruction from the base station.

Preferably, the relay station comprises:
a first receiving means for receiving a communication control message from said base station;
a regenerating means for regenerating a communication control message for the mobile station based on said communication control message from said base station;
a first sending means for sending the regenerated communication control message to said mobile station on a first subchannel according to said communication control message from said base station.

According to the third aspect of the present invention, a method is provided for utilizing a relay station for communication in a base station in a wireless communication network, said method comprises the steps of:
sending a communication control message to a relay station;
receiving a status report message from said relay station on a third subchannel and receiving the signals from a mobile station on a tenth channel according to said communication control message;
obtaining a first status information presenting the channel status of the channel between said mobile station and said relay station and a second status information presenting the channel status of the channel between said relay station and said base station from the signals from said relay station, and obtaining a third status information presenting the channel status of the channel between said mobile station and said base station from the signals from said mobile station;
selecting a suitable communicating path for communicating with said mobile station based on said first status information, said second status information and said third status information;
controlling the communication with said mobile station according to said selected suitable communicating path.

According to the fourth aspect of the present invention, a base station is provided for utilizing a relay station for communication with coverage extension in a wireless communication network, said base station comprises:

a sending means for sending a communication control message to a relay station;

a receiving means for receiving a status report message from said relay station on a third subchannel and receiving the signals from a mobile station on a tenth channel according to said communication control message;

an obtaining means for obtaining a first status information presenting the channel status of the channel between said mobile station and said relay station and a second status information presenting the channel status of the channel between said relay station and said base station from the signals from said relay station, and obtaining a third status information presenting the channel status of the channel between said mobile station and said base station from the signals from said mobile station;

a path selecting means for selecting a suitable communicating path for communicating with said mobile station based on said first status information, said second status information and said third status information;

a communication control means for controlling the communication with said mobile station according to said selected suitable communicating path.

The present invention comprises the following advantages over prior art:

Due to the fact that all control and scheduling functions are still located in the base station, and the relay station just takes the responsibility of broadcast and some bearer data forwarding, the design of relay station is very simple and the cost is correspondingly low. The most important advantage is this proposal is completely backward compatible with current standard such that the legacy mobile station located out of the BS's coverage is supported to get the benefit of coverage extension from relaying. That means, with this proposal, the base station coverage can be easily extended to support legacy mobile station with a little charge of the cost of the relay station.

BRIEF DESCRIPTION ON THE DRAWINGS

Other objects and effects of the present invention will become more apparent by following detailed description taken in conjunction with the accompanying drawings, in which.

Wherein, like reference numerals designate the same, similar or corresponding features or functions throughout the figures above.

DESCRIPTION OF THE PREFERRED EMBODIMENTS

Hereinafter, embodiments of the present invention will be described in detail with respect to the accompanying drawings.

Figure 1A:
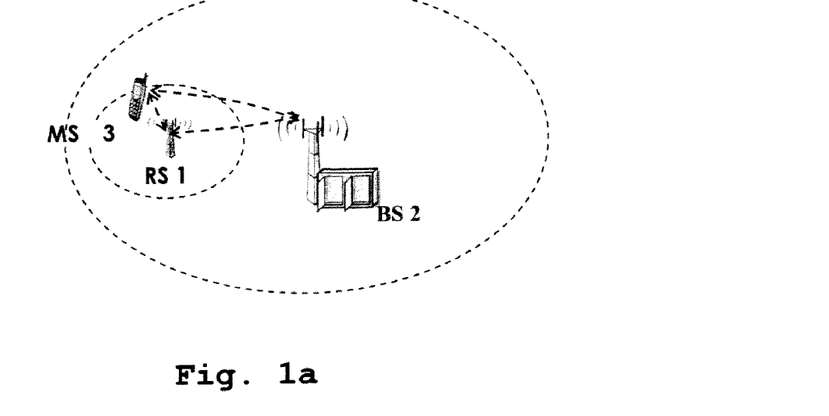
FIG. 1a shows an exemplary relay network without coverage extension of the base station in the prior art.

FIG. 1a shows an exemplary relay network without coverage extension of the base station in the prior art. In FIG. 1a, the relay network includes a relay station (RS) 1, a base station (BS) 2 and a mobile station (MS) 3.

As shown in FIG. 1a, the MS 3 is located in the coverage of the BS 2 and the coverage of the RS 1.

Since the MS 1 is located in the coverage of the BS 2, the downlink control signals from BS 2 can reach MS 3 directly without RS 2 involvement. RS can be used for just forwarding bearer data to achieve throughout enhancement. The implementing complexity of RS is relatively low.

Figure 1B:
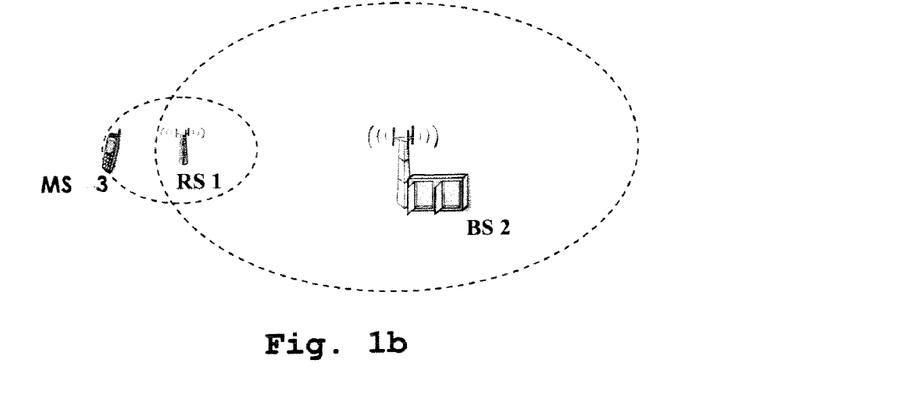
FIG. 1b shows an exemplary relay network with the need of coverage extension of the base station according to one embodiment of the present invention.

FIG. 1b shows an exemplary relay network with the need of coverage extension of the base station in the prior art. Same as FIG. 1a, the relay network in FIG. 1b includes a RS 1, a BS 2 and a MS 3.

As shown in FIG. 1b, MS 3 is located out of the coverage of BS 2, which means that MS 3 cannot communicate to BS 2 directly. All communications of the messages, including control messages and bearer data, have to be relayed by the RS 1. In some cases, even RS 1 can be located out of the general coverage of BS 2, the relay link is available due to RS 1 is more powerful than MS 3 (including higher transmitting power and receiving and processing capability), since RS 1 normally transmits signal with higher power level than MS 3 and the propagation between BS 2 and RS 1 is LOS (line of sight).

As described above, due to the fact that MS 3 is out of the BS 2's coverage, all the information including control messages and bearer data between BS 2 and MS 3 has to be relayed. Resource allocation scheme is required with low complexity, high efficiency and backward compatibility. The present invention provides a relay method utilizing such a resource allocation scheme for coverage extension of the base station. It should be noted that the relay method of the present invention is not only applicable to the scenario shown in FIG. 1b, but also applicable to the scenario of the MS 3 being in the coverage of the BS 2. Hereinafter the working way of the relay solution of the present invention in different scenarios will be described in detail in conjunction with FIG. 1c.

Figure 1C:
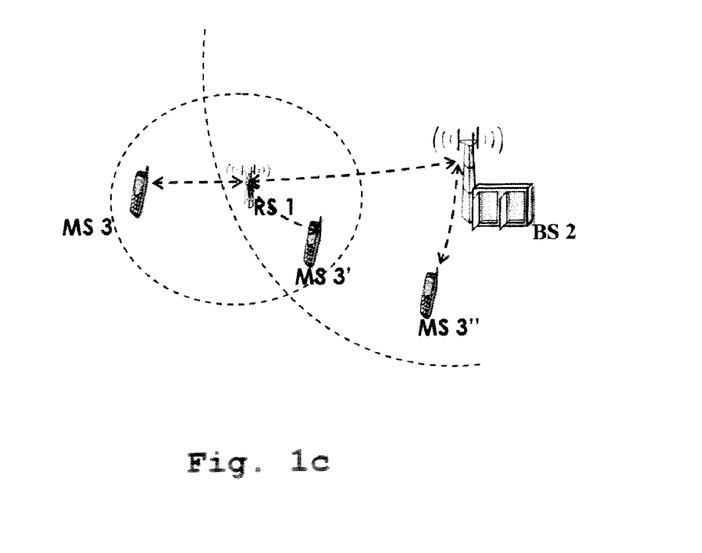
FIG. 1c shows an exemplary relay network with mobile stations being located in different positions according to one embodiment of the present invention.

FIG. 1c shows an exemplary relay network with mobile stations being located in different positions according to one embodiment of the present invention. The relay network includes a RS 1, a BS 2, a MS 3, a MS 3', a MS 3". As shown in FIG. 1c, the MS 3 is located in the coverage of the RS 1 but out of the coverage of the BS 2, the MS 3' is located in the coverage of the RS 1 and in the coverage of the BS 2, the MS 3" is located in the coverage of the BS 2 but out of the coverage of the RS 1.

As shown in FIG. 1c, in one embodiment of the present invention, based on the channel status information (referred as "status information" for simplicity) of RS 1, the MS 3' and the MS 3" being located in the coverage of BS 2, and MS 3 being located not in the coverage of BS 2 but in the coverage of RS 1, the BS 2 selects a suitable communication path for communication with each MS and generates a communication control message based on the suitable communication path selected, then sends the communication control message directly or via the RS 1 to each MS, wherein, the communication control message indicates the communication path selected and indicates the BS 2, the RS 1 and MSs to send specific information to specific receiver on specific channel and receive specific information from specific sender on specific channel. In addition, due to the specific cases of synchronization etc., the RS 1 needs to regenerate the communication control message from the BS 2 and sends the regenerated communication control message to MSs. Then, the BS 2 and RS 1 establish the direct communication or indirect communication between the BS 1 and MSs via the RS 1.

Hereinafter the working way of the relay method of the present invention will be described in detail with reference to FIG. 1c for the mobile stations being located in different positions.

For the MS 3

Since MS 3 is located out of the coverage of the BS 2 but in the coverage of the RS 1, only indirect communication path between the BS 2 and the MS 2 via the RS 1 can be established. The BS 2 receives the status report information (the status report information includes the channel status information indicating the channel status of the channel between the MS 3 and the RS 1), and sends a communication control message to the RS 1 and to the MS 3 via the RS 1. The communication control message indicates the communication path selected and indicates the BS 2, the RS 1 and MS 3 to send specific information to specific receiver on specific channel and receive specific information from specific sender on specific channel. Then the RS 1, the BS 2 and MS 3 carry through the communication between the BS 2 and MS 3 via the RS 1 according the communication control message.

For the MS 3'

Since MS 3' is located in the coverage of the BS 2 and in the coverage of the RS 1, the BS 2 can receive the signals directly from the MS 3' and receive the status report information about the MS 3' from the RS 1. The BS 1 selects a suitable communication path based on the performance comparison of direct communication path with the MS 3' and the indirect communication path with the MS 3' via the RS 1. If the BS 1 selects the indirect communication path with the MS 3' via the RS 1, the BS 1 sends a communication control message to the RS 1 and to the MS 3' via the RS 1. The communication control message indicates the communication path selected and indicates the BS 2, the RS 1 and MS 3' to send specific information to specific receiver on specific channel and receive specific information from specific sender on specific channel. Then the RS 1, the BS 2 and MS 3' carry through the communication between the BS 2 and MS 3' via the RS 1 according the communication control message. If the BS 2 selects the direct communication path with the MS 3', the RS 1 isn't involved.

For the MS 3"

Since MS 3" is located in the coverage of the BS 2 but out of the coverage of the RS 1, the direct communication path between the BS 2 and the MS 3" is established by the BS 2. The RS 1 is not involved.

Figure 2:
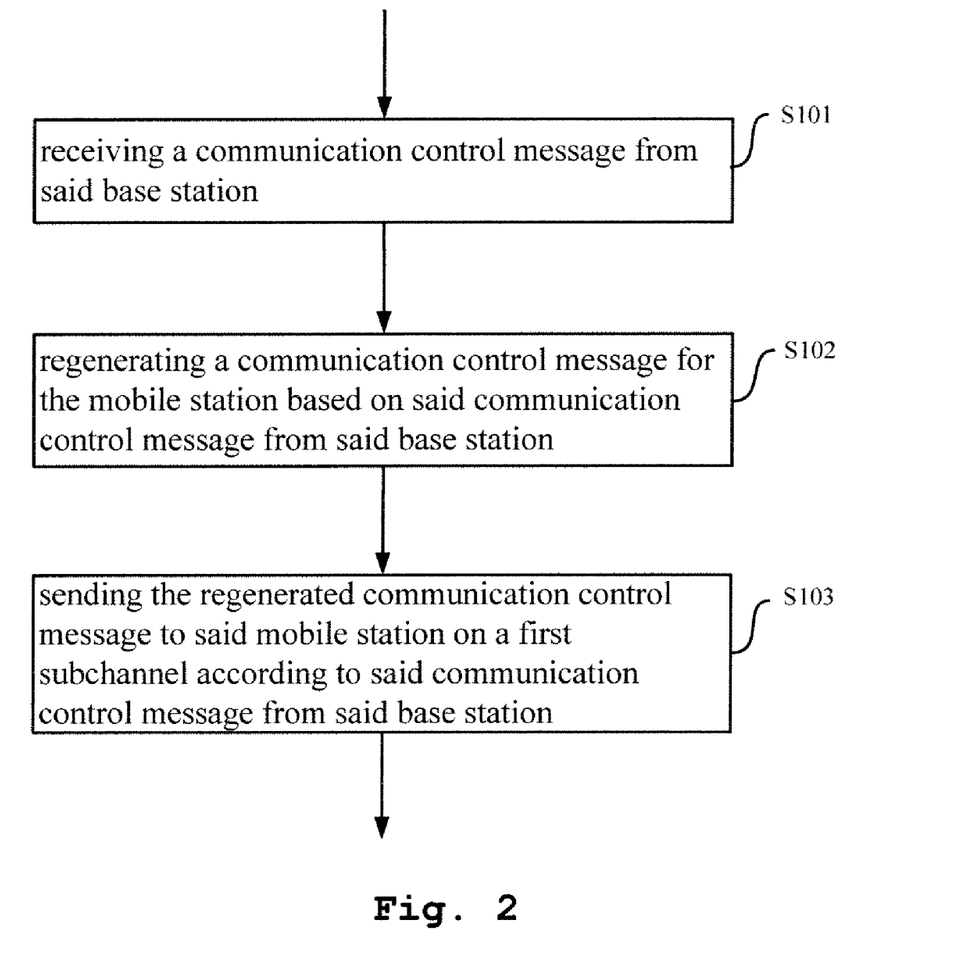
FIG. 2-4 show exemplary working flowcharts of relay methods for coverage extension of a base station in a relay station in a wireless communication network according to one embodiment of the present invention.
Figure 4A:
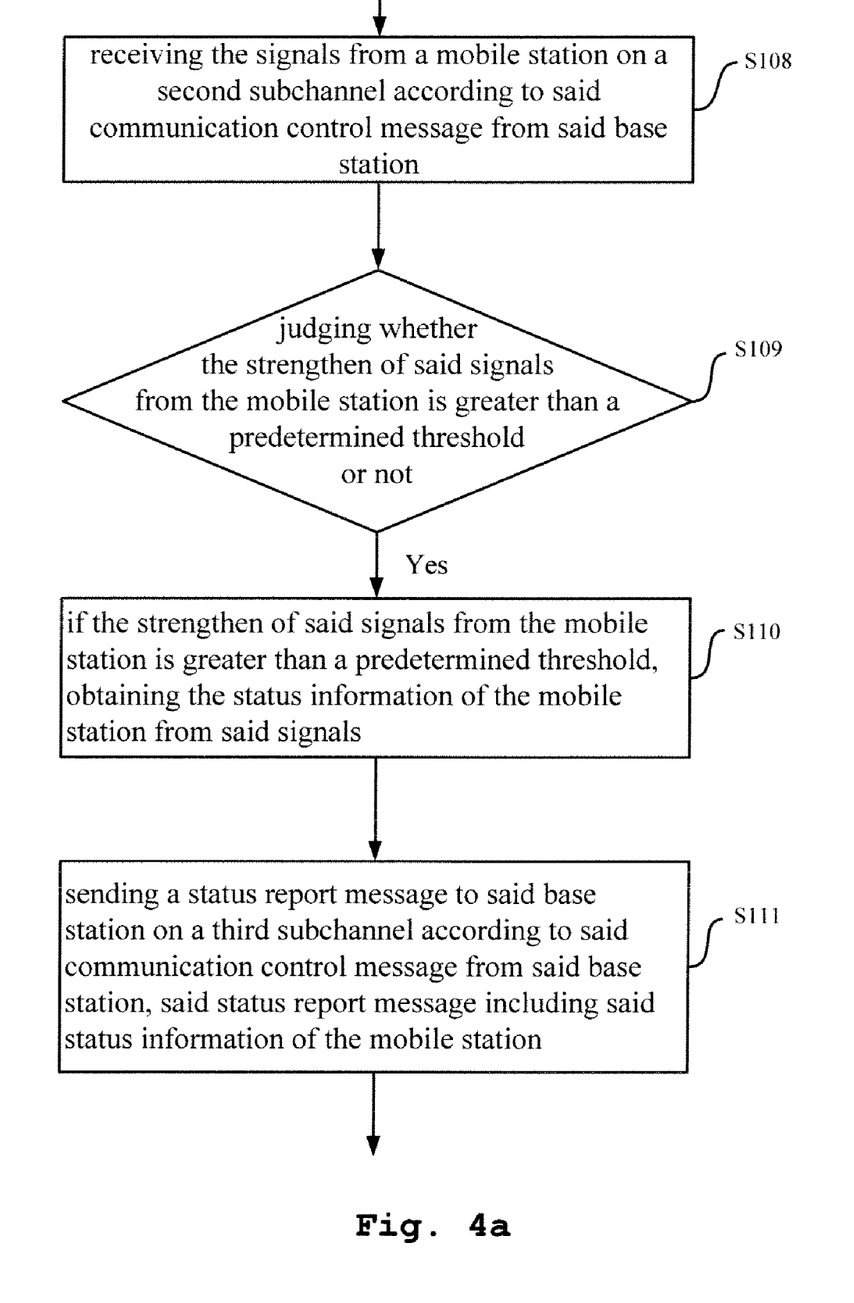
Figure 4B:
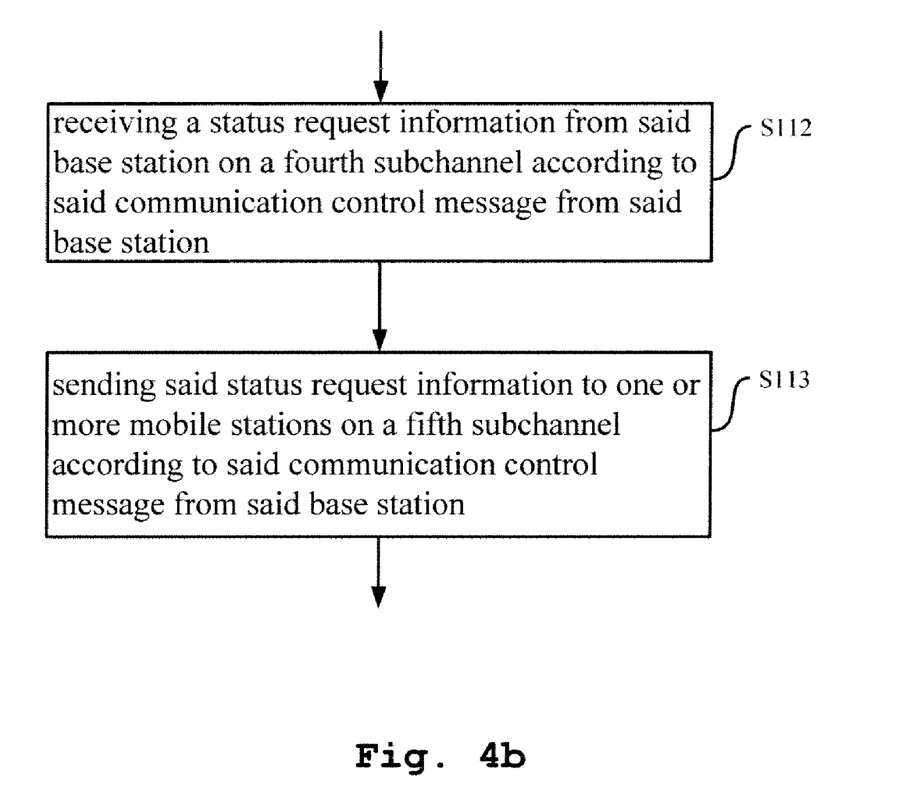
Figure 5:
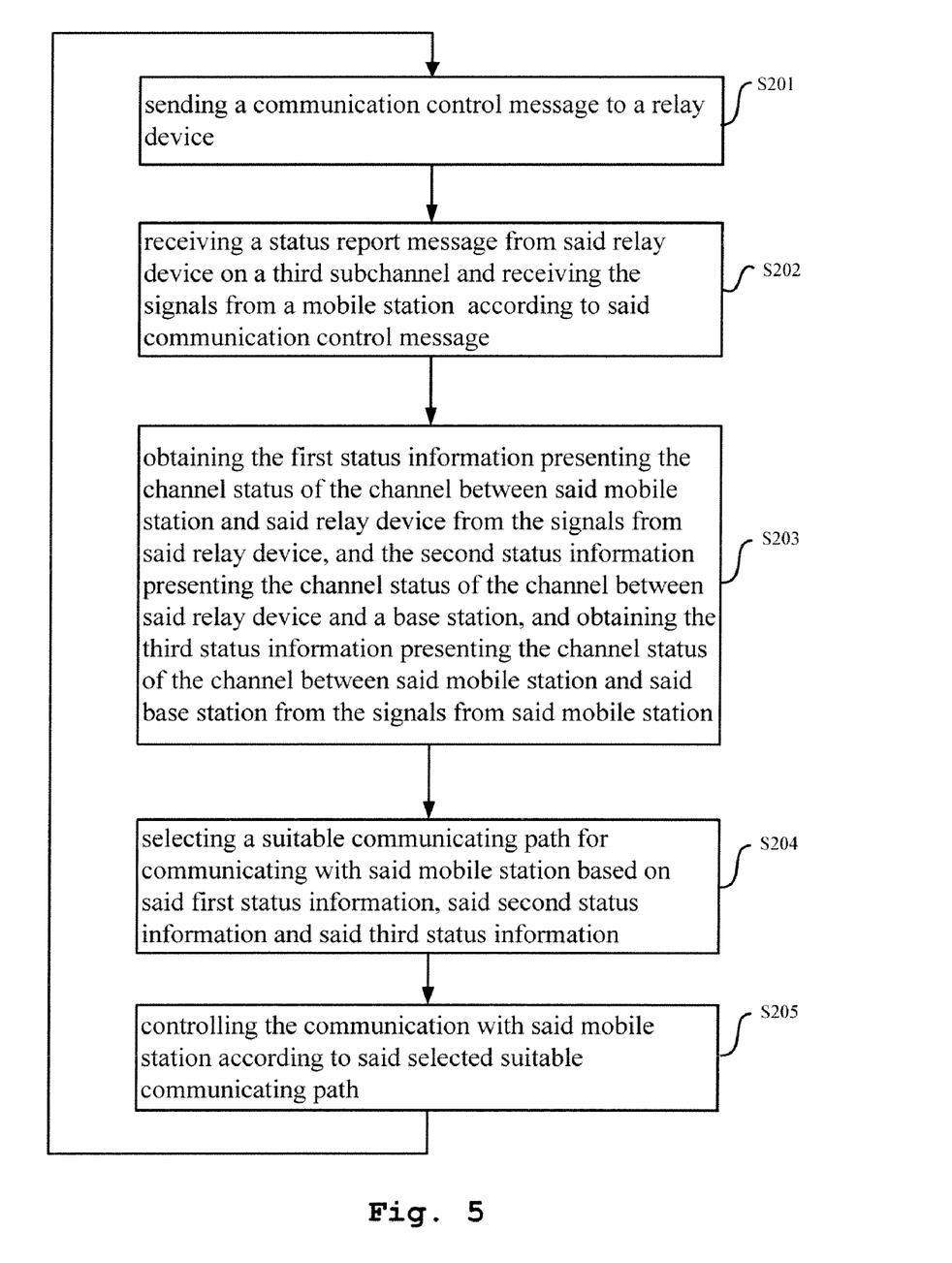
FIG. 5 shows an exemplary working flowchart of a communication method for coverage extension in a base station according to one embodiment of the present invention.

FIG. 2-4 show exemplary working flowcharts of relay methods for coverage extension of a base station in a relay station in a wireless communication network according to one embodiment of the present invention and FIG. 5 shows an exemplary working flowchart of a communication method for coverage extension in a base station according to one embodiment of the present invention.

Hereinafter, the process of the BS 2 establishing the indirect communication path with the MS 3 via the RS 1 will be described in detail with reference to FIG. 2 to 5.

Since the MS 3 is located out of the coverage of the BS 2, the MS 3 can't synchronize with the BS 2, so the RS 1 should regenerate the preamble for the MS 3. Since the communication control message sent by the BS 2 is aligned with the BS 2's preamble, for the MS 3's receiving synchronously, the RS 1 should regenerate the communication control message from the BS 2, modify the regenerated communication control message to be aligned with the preamble of the RS 1 and send the regenerated communication control message to the MS 3. Wherein, the communication control message indicates the communication path selected and indicates the BS 2, the RS 1 and the MS 3 to send specific information to specific receiver on specific channel and receive specific information from specific sender on specific channel. The flowchart is shown in FIG. 2. In step S101, the RS 1 receives the communication control message from the BS 2. In step S102, the RS 1 regenerates the communication control message from the BS 2 for the MS 3 according to the communication control message from the BS 2. In step S103, the RS 1 sends the regenerated communication control message to the MS 3 on a first subchannel according to the communication control message from the BS 2.

Figure 3A:
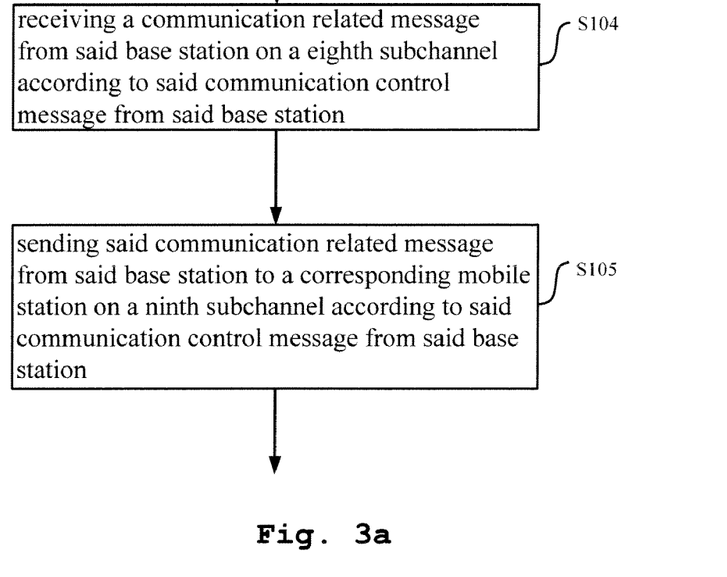

After receiving the communication control message from the BS 2, the RS 1 gets that a eighth subchannel is allocated by the BS 2 for the BS 2 sending a communication related message to the RS 1 and a ninth subchannel is allocated by the BS 2 for the RS 1 sending the communication related message from the BS 2 to the MS 3. As shown in FIG. 3a, in step S104, the RS 1 receives the communication related message from the BS 2 on the eighth subchannel according to the communication control message from the BS 2; in step S105, the RS 1 sends the communication related message from the BS 2 to the MS 3 on the ninth subchannel according to the communication control message from the BS 2. Wherein, the communication related message from the BS 2 includes a communication establishing response message, a communication ending response message and traffic bearer data etc.

Figure 3B:
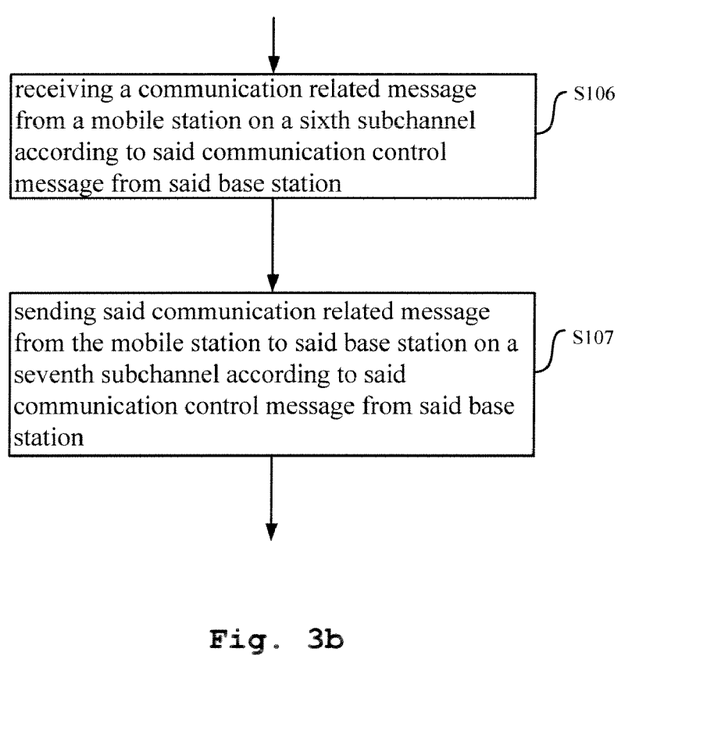

After receiving the communication control message from the BS 2, the RS 1 gets that a sixth subchannel is allocated by the BS 2 for the MS 3 sending the communication related message to the RS 1 and a seventh subchannel is allocated by the BS 2 for the RS 1 sending the communication related message from the MS 3 to the BS 2. As shown in FIG. 3b, in step S106, the RS 1 receives the communication related message from the MS 3 on the sixth subchannel according to the communication control message from the BS 2; in step S107, the RS 1 sends the communication related message from the MS 3 to the BS 2 on the seventh subchannel according to the communication control message from the BS 2. Wherein, the communication related message from the MS 3 includes a communication establishing request message, a communication ending request message and traffic bearer data etc.

Since the MS 3 is located out of the coverage of the BS 2, the BS 2 doesn't know the existing of the MS 3, so the BS 2 needs to allocate a second subchannel for the communication between the MS 3 and RS 1, and a third channel for the BS 2 obtaining the status report message (the status report message includes the channel status information indicating the channel status of the channel between the MS 3 and the RS 1) of the MS 3. After the RS 1 receives the signals from the MS 3, if the strength of the signals from the MS 3 is greater than the predetermined threshold, which means that the channel status of the channel between the RS 1 and the MS 3 is in good condition, the RS 1 then reports the status information to the BS 2. As shown in FIG. 4a, in step S108, the RS 1 receives the signals from the MS 3 on the second subchannel according to the communication control message from the BS 2; in step S109, the RS 1 judges whether the strengthen of the signals from the MS 3 is greater than the predetermined threshold or not; in step S110, the RS 1 obtains the status information of the MS 3 from the signals from the MS 3 if the strengthen of said signals from the MS 3 is greater than the predetermined threshold; then in step S111, the RS 1 sends a status report message, which includes the status information of the MS 3, to the BS 2 on the third subchannel according to the communication control message from the BS 2.

Since the location of each MS may change at any moment, the BS 2 needs to collect the status information of the RS 1 and MSs in time and modifies the communication path if necessary based on the change of the status information and regenerates the communication control message and sends the regenerated communication control message to the RS 1 and each MS directly or to each MS indirectly via the RS 1. The BS 2 allocates a fourth subchannel for itself sending a status request message, which is used for querying the status of MS 3, to the RS 1 periodically, and a fifth subchannel for the RS 1 sending the status request message to the MS 3. Meanwhile, the BS 2 also allocates a tenth subchannel for itself receiving the status information directly from MSs. The process of the RS 1 forwarding the status request message from the BS 2 to the MS 3 is shown in FIG. 4b. In step S112, the RS 1 receives a status request message from the BS 2 on the fourth subchannel according to the communication control message from the BS 2. In step S113, the RS 1 sends the status request message from the BS 2 to the MS 3 on the fifth subchannel according to the communication control message from the BS 2. The process of the BS collecting the status information of the RS 1 and MSs periodically to modify the communication path based on the change of the status information and regenerate the communication control message can be obtained with the combination of FIG. 4a and FIG. 4b, as shown in FIG. 5. In step S202, the BS 2 receives a status report message from the RS 1 on the third subchannel and the signals from the MS 3 on the tenth subchannel according to the communication control message. In step S203, the BS 2 obtains a first status information presenting the channel status of the channel between the MS 3 and the RS 1 and a second status information presenting the channel status of the channel between the RS 1 and the BS 2 from the signals from the RS 1, and a third status information presenting the channel status of the channel between the MS 3 and the BS 2 from the signals from the MS 3. In step S204, the BS 2 selects a suitable communicating path for communicating with the MS 3 based on the first status information, the second status information and the third status information. In step S205, the BS 2 controls the communication with the MS 3 according to the selected suitable communicating path and generates a new suitable communication control message. Wherein, the strength of the signals received by the BS 2 from the MS 3 on the tenth subchannel can be regarded as zero when the MS 3 is located out of the coverage of the BS 2.

When the BS 2 takes the initiative in querying the status of the MS 3, the following step may be inserted after step S202 in FIG. 5: the BS 2 sends a status request message to the RS 1 on the fourth subchannel according to the communication control message.

When establishing the indirect communication path between the MS 3 and the BS 2 via the RS 1, the BS 2 sends a first communication related information to the RS 1 on the eighth subchannel and receives a second communication related information the second communication related information from the RS 1 on the seventh subchannel according to the communication control message. The first communication related information includes a communication establishing request message, a communication ending request message and traffic bearer data from the MS 3. And the second communication related message includes a communication establishing response message, a communication ending response message and traffic bearer data from the BS 2.

It is noted that above methods may be combined (different combination in time domain and frequency domain) to achieve a lot of different embodiments. Another embodiment of the present invention will be described in conjunction with a specific frame structure and the block diagrams of the RS 1 and the BS 1.

Figure 6:
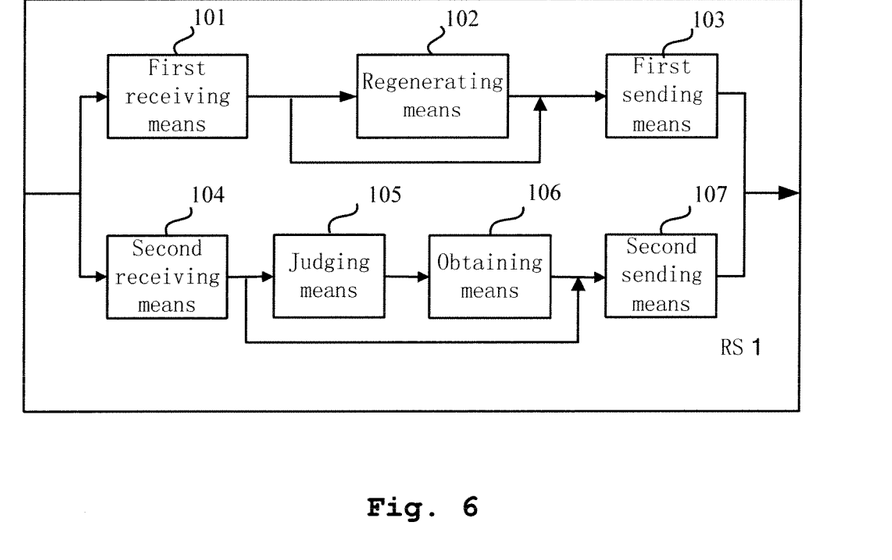
FIG. 6 shows an exemplary block diagram of a relay station which is utilized for coverage extension of a base station according to one embodiment of the present invention.

FIG. 6 shows an exemplary block diagram of the RS 1 which is utilized for coverage extension of the BS 2 according to one embodiment of the present invention. The RS 1 includes first receive means 101, regenerating means 102, first sending means 103, second receiving means 104, judging means 105, obtaining means 106 and second sending means 107.

Figure 7:
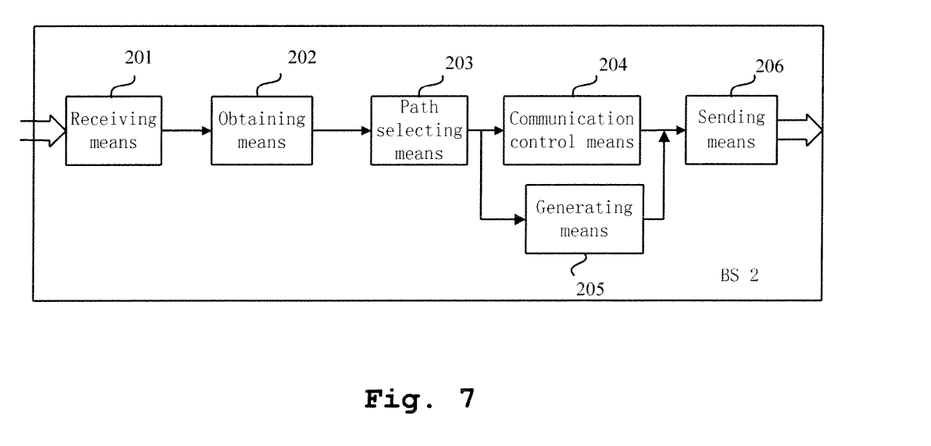
FIG. 7 shows an exemplary block diagram of a base station which is utilized for coverage extension of a base station according to one embodiment of the present invention.

FIG. 7 shows an exemplary block diagram of the BS 2 for coverage extension according to one embodiment of the present invention. The BS 2 includes receiving means 201, obtaining means 202, path selecting means 203, communication control means 204, generating means 205 and sending means 206.

Figure 8A:
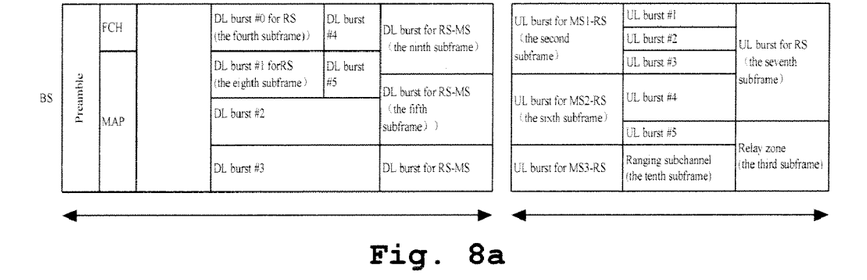
FIG. 8a shows an exemplary frame structure from the view of a base station according to one embodiment of the present invention.
Figure 8B:
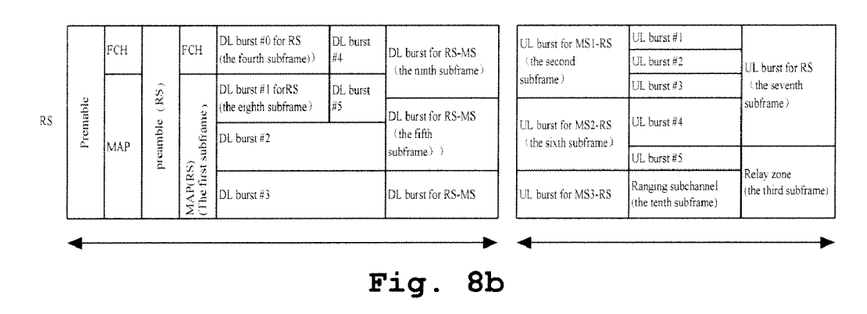
FIG. 8b shows an exemplary frame structure from the view of a relay station according to one embodiment of the present invention.
Figure 8C:
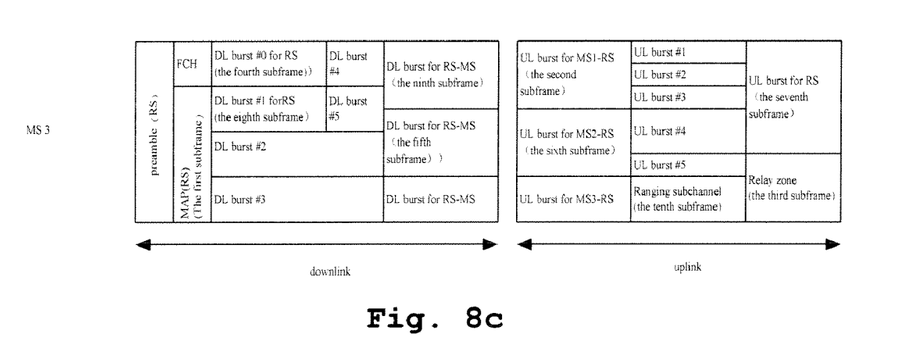
FIG. 8c shows an exemplary frame structure from the view of a mobile station which is located out of the coverage of a base station but in the coverage of a relay station according to one embodiment of the present invention.

FIG. 8a shows an exemplary frame structure from the view of a base station according to one embodiment of the present invention. FIG. 8b shows an exemplary frame structure from the view of a relay station according to one embodiment of the present invention. In FIG. 8a to FIG. 8c, MAP information can be understood as one example of above said communication control information, subframe can be understood as the one example of above said subchannel.

The definition of the frame structure of the new relay system is the same as the existing IEEE 802.16 except that the RS 1 regenerates preamble, Frame Control Header (FCH) and MAP based on the broadcast information received from the BS 2 for those MSs which are located in the coverage of the RS 1 but out of the coverage of the BS 2. When the RS 1 sends preamble, Frame Control Header and MAP, the BS 2 should not send any data.

Another optional setting in the frame structure is the dedicated relay zone reservation. A dedicated relay zone is reserved in the frame for controlling UL information relaying, e.g. relaying of ranging request from the MS 3, where this relay zone is designed to be at (or near) the end of UL frames. The relay zone can also be used for measurement report from the RS 1 to the BS 2.

As explained above, some subchannel resources are required for the RS 1 to forward preamble and MAP information to the MS 3. As illustrated in the FIG. 8*a*, some subchannel resources are reserved in the BS 2 for the regeneration of preamble and MAP for the RS 1. Here the preamble of the RS 1 is a standard one that can be recognized by the MS 3. The preamble of the RS 1 might be the same or different as that of the BS 2. And MAP information of the RS 1 has the same content as that of the BS 2, while positioning information in MAP of the RS 1 is adjusted to the aligning of preamble of the RS 1. Thus the RS 1 provides complete preamble and MAP information to the MS 3 which is located out of the coverage of the BS 2. From the view of the RS 1, a complete IEEE802.16 frame is received. Also, a dedicated relay zone is reserved in the frame for controlling UL information relaying, e.g. relaying ranging request, where this relay zone is designed to be at (or near) the end of UL frames. Centralized control and schedule are used such that the BS 2 allocates resource arbitrarily. The RS 1 and the MS 3 receive and transmit data according to the BS 2's scheduling.

FIG. 8*b* is a complete relay frame structure definition. Due to the propagation attenuation and variable environments, MSs in different positions have different views of the frame. FIG. 1*c* introduces 3 MSs located in different positions. The MS 3 and MS 3' are located within the coverage of the RS 1, but the MS 3' is within of the coverage of the BS 2 and the MS 3 is out of the coverage of the BS 2. The MS 3" is out of the coverage of the RS 1 but within the coverage of the BS 2.

FIG. 8*c* illustrates the relay frame structure from the view of the MS which is out of the coverage of the BS, such as the MS 3 in FIG. 1*c*. Because the MS 3 is located out of the coverage of the BS 2, preamble and MAP from the BS 2 cannot directly reach the MS 3 and the MS 3 can just receives preamble and MAP information forwarded by the RS 1. The MS 3 is synchronized referring to preamble of the RS 1. From the view of the MS 3, the received frame is a complete standard IEEE 802.16 frame structure. All the procedures are the same, which guarantees the backward compatibility.

The MS 3" is located in the coverage of the BS 2 and out of the coverage of the RS 1. So it just communicates with the BS 2, and no RS is involved. The preamble and MAP information regenerated by the RS 1 are unavailable to the MS 3". The frame that the MS 3" receives is illustrated in FIG. 8*a*. After MAP of the BS 2, there is an idle period that is reserved for the RS 1. In MAP of the BS 2, this period is not permitted to be allocated to any MS. So it does not result in any impact to the MS 3".

From the view of the MS 3', the frame structure is a complete one, i.e. the frame structure illustrated in FIG. 8*b*. The MS 3' can see both preamble of the BS 2 and preamble of the RS 1. According to the standards of IEEE802.16, the MS 3' just select one with higher power level for synchronization and the other is omitted. After the synchronization, the procedure is the same as the MS 3 or the MS 3", depending on which preamble the MS 3' selects.

All MSs located in or out the coverage of the BS 2 just receive a standard IEEE802.16 frame no matter whether the preamble information is relayed or not. MS does not recognize the existence of the RS 1, and acts as legacy procedure. For MS under the direct control of the BS 2, the RS 1 does nothing to their direct communication. For other communication with the RS 1's involvement, all information, including broadcast control information and bearer data are required to be relayed.

According to the frame structure definition shown in FIG. 8*a* to 8*c*, the first subframe is allocated for the RS 1 sending MAP information to the MS 3; the second subframe is allocated for the MS 3 sending the ranging request message to the RS 1; the third subframe is allocated for above said dedicated relay zone to relay ranging request of MS 3; the fourth subframe is allocated for the BS 2 sending status request message for querying the status of the MS 3 to the RS 1; the fifth subframe is allocated for the RS 1 sending the status report message from the BS 2 to the MS 3; the sixth subframe is allocated for the MS 3 sending the communication related message to the RS 1; the seventh subframe is allocated for the RS 1 sending the message from the MS 3 to the BS 2; the eighth subframe is allocated for the BS 2 sending the communication related message to the RS 1; the ninth subframe is allocated for the RS 1 sending communication related message from the BS 2 to the MS 3; the tenth subframe is allocated for the MS 3 sending signals to the BS 2. Wherein, the status report information includes the channel status information indicating the channel status of the channel between the MS 3 and the RS 1; the communication related message from the BS includes a communication establishing response message, a communication ending response message and traffic bearer data etc.; the communication related message from the MS 3 includes a communication establishing request message, a communication ending request message and traffic bearer data etc.

Figure 9:
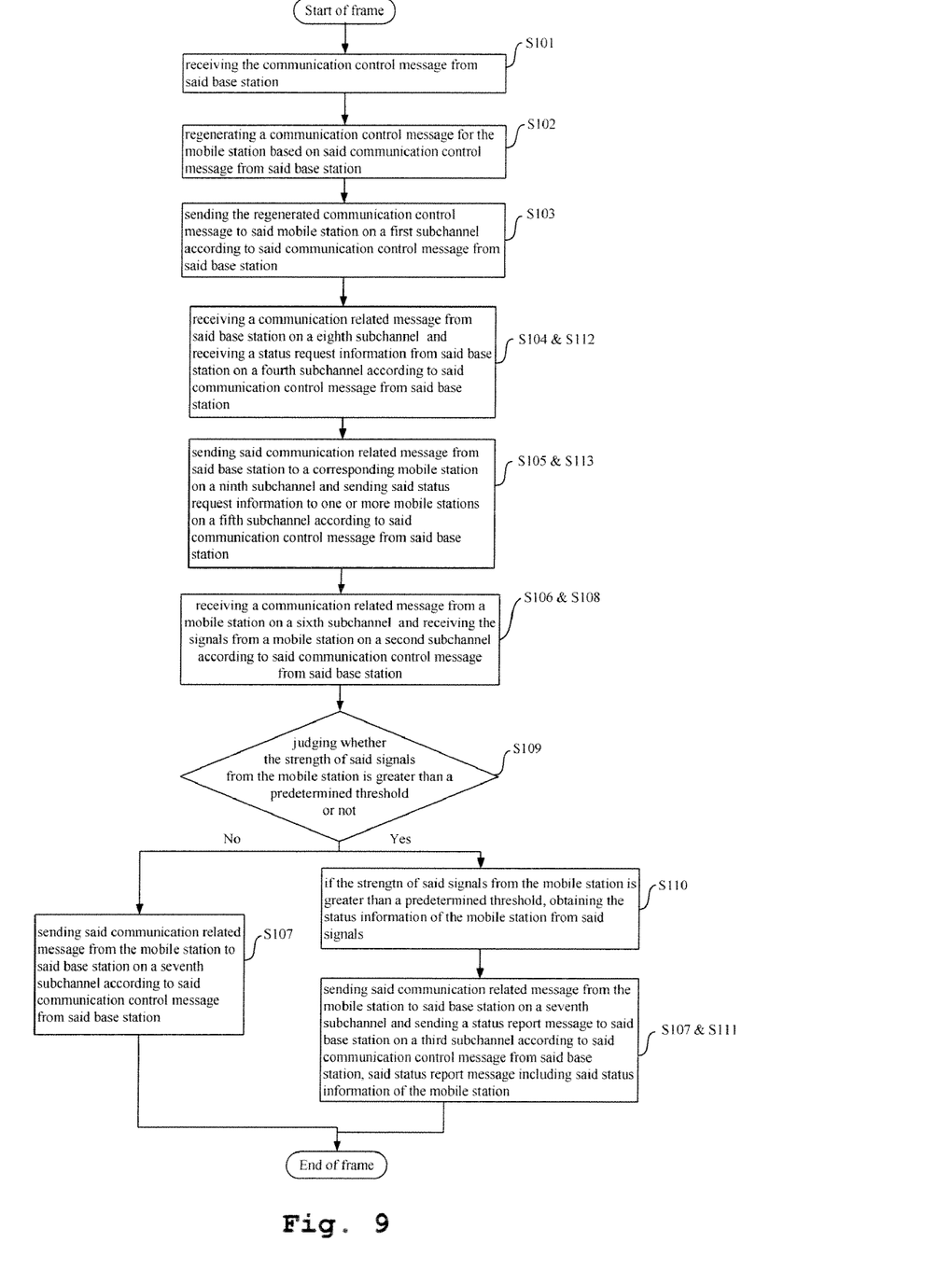
FIG. 9 shows an exemplary flowchart for a relay station forwarding control information and bearer data in a wireless communication network according to one embodiment of the present invention.

FIG. 9 shows an exemplary flowchart for the RS 1 forwarding control information and bearer data in a wireless communication network according to one embodiment of the present invention.

At the start of the frame, in the downlink, in step S101, the first receiving means of the RS 1 receives the MAP information from the BS 2. Since MS 3 could only be synchronized with RS 1, the MAP information is adjusted to the aligning of preamble of the RS 1 and sent to the MS 3, and in step S102, the regenerating means 102 regenerates the MAP information for the MS 3 according to the MAP information from the BS 2. In step S103, the first sending means 103 sends the regenerated MAP information to the MS 3 at the first subframe. In step S104, the first receiving means 101 receives the communication related message from the BS 2 at the eighth subframe according to the MAP information from the BS 2. In step S112, the first receiving means 101 receives the status request message from the BS 2 at the fourth subframe according to the MAP information from the BS 2. The first sending means 103 sends the communication related message from the BS 2 to the corresponding MS 3 at the ninth subframe according to the MAP information from the BS 2 in step S105 and the status request message from the BS 2 to the MS 3 at the fifth subframe in step S113 according to the MAP information from the BS 2.

In uplink, the second receiving means 104 receives the communication related message from the MS 3 at the sixth subframe according to the MAP information from the BS 2 in step S106 and the signals from the MS 3 at the second subframe according to the MAP information from the BS 2 in step S108. The judging means 105 judges whether the strength of the signals from the MS 3 is greater than the predetermined threshold or not. If the strength of the signals from the MS 3 is smaller than the predetermined threshold, then the second sending means 107 sends the communication related message from the MS 3 to the BS 2 at the seventh subframe according to the MAP information from the BS 2 in step S107 and the frame ends. If the strength of the signals from the MS 3 is greater than the predetermined threshold, the obtaining means 106 obtains status information of the MS 3 from the signals from the MS 3. The second sending means 107 sends the communication related message from the MS 3 to the BS 2 at the seventh subframe in step S107 and sends the status report message which includes the status information of the MS 3 to the BS 2 at the third subframe in step S111 according to the MAP information from the BS 2. Then the frame ends.

In this embodiment, the flowchart of the BS 2 collecting the status information of the RSs and MSs periodically or continuously and modifying the communication path if necessary based on the change of the status information and regenerating the communication control message is shown in FIG. 5. In step S201, the sending means 206 sends the preamble and MAP information to the RS 1. In step S202, the receiving means 201 receives the status report message from the RS 1 at the third subframe and the signals from the MS 3 at the tenth subframe according to the MAP information. In step S203, the obtaining means 202 obtains the first status information presenting the channel status of the channel between the MS 3 and the RS 1 and the second status information presenting the channel status of the channel between the RS 1 and the BS 2 according to the signals from the RS 1, and the third status information presenting the channel status of the channel between the MS 3 and the BS 2 according to the signals from the MS 3. In step S204, the path selecting means 203 selects a suitable communicating path for communicating with the MS 3 based on the first status information, the second status information and the third status information. In step S205, the communication control means 204 controls the communication with the MS 3 according to the selected suitable communicating path and the generating means 205 generates a new suitable communication control message.

Wherein, when the BS 2 takes the initiative in querying the status information of the MS 3, the following step may be inserted after step S202 in FIG. 5: the sending means 206 sends a status request message to the RS 1 at the fourth subframe according to the communication control message.

When establishing the indirect communication path between the MS 3 and the BS 2 via the RS 1, the process of the indirect communication between the MS 3 and the BS 2 further includes: the communication control means 204 controls the sending means 206 to send the first communication related information to the RS 1 at the eighth subframe and the receiving means 201 to receive the second communication related information the second communication related information from the RS 1 at the seventh subframe, according to said MAP information. The first communication related information includes a communication establishing request message, a communication ending request message and traffic bearer data from the MS 3. And the second communication related message includes a communication establishing response message, a communication ending response message and traffic bearer data from the BS 2.

It is noted from one embodiment of the present invention that above said first subchannel to tenth subchannel could be implemented in one frame. Above said third channel and tenth channel might be the same physical subchannel when implemented.

It is noted that the present invention is also applicable to the scenario of the MS being located in both the coverage of the BS and the coverage of the RS.

Figure 10:
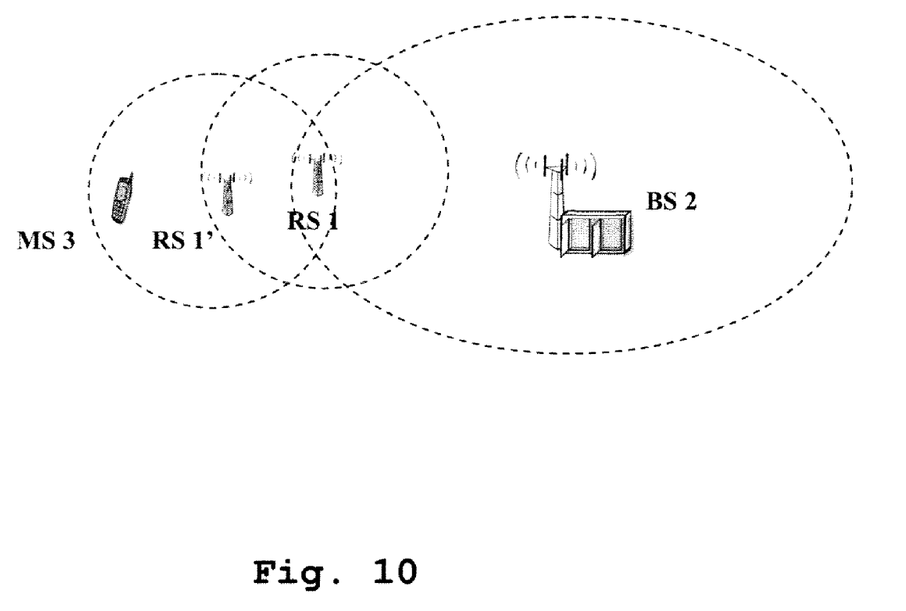
FIG. 10 shows an exemplary structure of a three hops network.

In addition, though above embodiments are described in conjunction with single hop relay networks, it should be understood to those skilled in the art that the present invention is also applicable to multi hop relay networks. For three hops relaying as shown in FIG. 10, for uplink, from the view of the RS 1, the signals it receives from the MS 3 can be regarded as the signals forwarded by the RS 1' (or several other RSs) from the MS 3; for downlink, from the view of the RS 1', the signals it receives from the BS 2 can be regarded as the signals forwarded by the RS 1 (or several other RSs) from the BS 2. And so on, the present invention is applicable to multiple hops relaying communication.

As many different embodiments of the present invention can be made without departing from the spirit and scope thereof, it should be understood that the invention is not limited to the specific embodiments thereof except as defined in the appended claims.

What is claimed is:

1. A method for implementing relay in a relay station in a wireless communication network, the method comprising:
    forwarding control information from a base station to a mobile station or forwarding control information from the mobile station to the base station according to an instruction from the base station;
    receiving a communication control message from said base station;
    regenerating a communication control message for the mobile station based on said communication control message from said base station;
    sending the regenerated communication control message to said mobile station on a first channel according to said communication control message from said base station;
    receiving signals from a mobile station on a second channel according to said communication control message from said base station;
    judging whether the strength of said signals from the mobile station is greater than a predetermined threshold or not;
    if the strength of said signals from the mobile station is greater than the predetermined threshold, obtaining the status information concerning the mobile station from said signals; and
    sending a status report message to said base station on a third channel according to said communication control message from said base station, said status report message including said status information concerning the mobile station.

2. The method according to claim 1 further comprising:
    receiving status request information from said base station on a fourth channel according to said communication control message from said base station;
    sending said status request information to one or more mobile stations on a fifth channel according to said communication control message from said base station.

3. The method according to claim 2 further comprising the following steps:
    receiving a communication related message from a mobile station on a sixth channel according to said communication control message from said base station;
    sending said communication related message from the mobile station to said base station on a seventh channel according to said communication control message from said base station.

4. The method according to claim 3, further comprising:
    receiving a communication related message from said base station on an eighth channel according to said communication control message from said base station; and
    sending said communication related message from said base station to a corresponding mobile station on a ninth channel according to said communication control message from said base station.

5. The method according to claim 4, wherein said communication related message from said base station includes:
    a communication establishing response message,
    a communication ending response message, and
    traffic bearer data.

6. The method according to claim 3, wherein said communication related message from the mobile station includes:
- a communication establishing request message,
- a communication ending request message, and
- traffic bearer data.

7. A relay station for implementing relay in a wireless communication network, the relay station configured to forward control information from a base station to a mobile station or to forward control information from the mobile station to the base station according to an instruction from the base station, the relay station comprising:
- at least one receiver configured to receive a communication control message from said base station;
- at least one processor;
- the at least one processor configured to regenerate a communication control message to create a regenerated communication control message for the mobile station based on said communication control message from said base station;
- at least one transmitter configured to send the regenerated communication control message to said mobile station on a first channel according to said communication control message from said base station;
- wherein the at least one receiver is configured to receive signals from a mobile station on a second channel according to said communication control message from said base station;
- wherein the at least one processor is configured to judge whether the strength of said signals from the mobile station is greater than a predetermined threshold or not;
- wherein the at least one processor is configured to obtain status information concerning the mobile station from said signals if the strength of said signals from the mobile station is greater than the predetermined threshold; and
- wherein the at least one transmitter is operative to send a status report message to said base station on a third channel according to said communication control message from said base station, said status report message including said status information concerning the mobile station.

8. The relay station according to claim 7:
wherein the at least one receiver is configured to receive status request information from said base station on a fourth channel according to said communication control message from said base station; and
wherein said at least one transmitter is configured to send said status request information to one or more mobile stations on a fifth channel according to said communication control message from said base station.

9. The relay station according to claim 8:
wherein said at least one receiver is configured to receive a communication related message from a mobile station on a sixth channel according to said communication control message from said base station; and
wherein said at least one transmitter is configured to send said communication related message from the mobile station to said base station on a seventh channel according to said communication control message from said base station.

10. The relay station according to claim 9:
wherein said at least one receiver is configured to receive a communication related message from said base station on an eighth channel according to said communication control message from said base station; and
wherein said at least one receiver is configured to receive said communication related message from said base station to a corresponding mobile station on a ninth channel according to said communication control message from said base station.

11. The relay station according to claim 10, wherein said communication related message from said base station includes:
- a communication establishing response message,
- a communication ending response message, and
- traffic bearer data.

12. The relay station according to claim 9, wherein said communication related message from said mobile station includes:
- a communication establishing request message,
- a communication ending request message, and
- traffic bearer data.

13. A method for utilizing a relay station for communication with a base station in a wireless communication network, comprising:
- sending a communication control message to a relay station;
- receiving a status report message from said relay station on a first channel and receiving signals from a mobile station on a second channel according to said communication control message;
- obtaining first status information representing a channel status of a channel between said mobile station and said relay station and a second status information representing a channel status of a channel between said relay station and a base station from signals from said relay station, and obtaining third status information representing a channel status of a channel between said mobile station and said base station from signals from said mobile station;
- selecting a suitable communicating path for communication with said mobile station based on said first status information, said second status information and said third status information; and
- controlling the communication with said mobile station according to said selected suitable communicating path.

14. The method according to claim 13, further comprising:
sending a status request message to said relay station on a third channel according to said communication control message.

15. The method according to claim 13, further comprising:
generating a new communication control message based on said selected suitable communicating path;
wherein sending a communication control message to a relay station comprises:
sending said new communication control message to said relay station.

16. The method according to claim 13, wherein, when establishing a relay path between said mobile station and said base station via said relay station, controlling the communication with said mobile station comprises:
controlling sending a first communication related information to said relay station on a third channel, and
controlling receiving a second communication related information from said relay station on the first channel according to said communication control message.

17. The method according to claim 16:
wherein said first communication related information includes:
- a communication establishing request message,
- a communication ending request message, and
- traffic bearer data from said mobile station; and
wherein said second communication related message includes:

a communication establishing response message,
a communication ending response message, and
traffic bearer data from said base station.

18. The method according to claim 13, wherein said communication path including the direct communication path between said mobile station and said base station and the indirect communication path between said mobile station and said base station via said relay station with one-hop or multi-hop relay links.

19. A base station, comprising:
at least one transmitter configured to send a communication control message to a relay station;
at least one receiver configured to receive a status report message from said relay station and to receive signals from a mobile station according to said communication control message; and,
at least one processor configured to obtain first status information representing a channel status of a channel between said mobile station and said relay station and second status information representing a channel status of a channel between said relay station and said base station from signals from said relay station, and to obtain third status information representing a channel status of a channel between said mobile station and said base station from signals from said mobile station;
wherein the at least one processor is configured to select a suitable communicating path for communication with said mobile station based on said first status information, said second status information and said third status information; and
wherein the at least one processor is configured to control the communication with said mobile station according to said selected suitable communicating path.

20. The base station according to claim 19, wherein said at least one transmitter is configured to send a status request message to said relay station on a channel according to said communication control message.

21. The base station according to claim 19, wherein said at least one processor is configured to generate a new communication control message based on said selected suitable communicating path; and wherein the at least one transmitter is configured to send said new communication control message to said relay station.

22. The base station according to claim 19, wherein said at least one processor is further configured to control said at least one transmitter to send first communication related information to said relay station on a first channel, and to control said at least one receiver to receive second communication related information from said relay station on a second channel according to said communication control message when establishing a relay path between said mobile station and said base station via said relay station.

23. The base station according to claim 22:
wherein said first communication related information includes:
a communication establishing request message,
a communication ending request message, and
traffic bearer data from said mobile station; and
wherein said second communication related message includes:
a communication establishing response message,
a communication ending response message, and
traffic bearer data from said base station.

24. The base station according to claim 19, wherein said communication path including the direct communication path between said mobile station and said base station and the indirect communication path between said mobile station and said base station via said relay station with one-hop or multi-hop relay links.

* * * * *